United States Patent [19]
Flener

[11] Patent Number: 5,529,443
[45] Date of Patent: Jun. 25, 1996

[54] WIRE FEEDING APPARATUS

[76] Inventor: Richard S. Flener, 205 E. Main, Wilburton, Okla. 74578

[21] Appl. No.: 308,562

[22] Filed: Sep. 19, 1994

[51] Int. Cl.⁶ .................................................. B23B 51/00
[52] U.S. Cl. ................................ 408/226; 254/134.3 FT; 408/227
[58] Field of Search .................................. 408/226, 227, 408/230; 7/158; 254/134.3 FT

[56] References Cited

U.S. PATENT DOCUMENTS

| | | | |
|---|---|---|---|
| 597,750 | 1/1898 | Smith | 408/230 |
| 839,461 | 12/1906 | Eastman | 408/226 |
| 3,697,188 | 10/1972 | Pope | 408/230 |
| 5,149,231 | 9/1992 | Bowling | 408/227 |
| 5,310,294 | 5/1994 | Perkins | 408/226 |

*Primary Examiner*—Daniel W. Howell

[57] ABSTRACT

A standard drill bit of any size is arranged so that the end opposite the cutting tip has a opening with a depth and diameter to accept the desired size of the medium, whereupon insertion of the medium is secured by a set screw perpendicular to and at a appropriate distance from the specified end.

1 Claim, 3 Drawing Sheets

STRUCTURE

WIRE OR CABLE   DRILL
4   6

WIRE FEEDING APPARATUS

BACKGROUND OF THE INVENTION

1. Field of the Invention

The field of the invention relates to the wire feeding apparatus, and more particularly to the new and improved method of feeding wire or cable through a structure by the use of the same apparatus used in making the hole.

2. Description of the Prior Art

The prior art has set forth various methods to effect the feeding of wire or cable through an opening in a structure, which those familiar to the art can see, that are time consuming and difficult. The present invention substantially improves the method by allowing the wire or cable to be feed through the opening with the same apparatus that made the opening with no need for further insulation due to the relevant size of the drilling apparatus to the medium size.

SUMMARY OF THE INVENTION

In view of the foregoing disadvantages of the known types of wire and cable feeding apparatus now present in the prior art, the present invention provides a wire and cable feeding apparatus that accepts the wire or cable in the end opposite the cutting tip and allows the wire or cable to be feed through with the same. As such, the general purpose of the present invention, which will be described subsequently in greater detail, is to provide a new and improved wire and cable feeding apparatus which has all the advantages of the prior art wire and cable feeding apparatus and none of the disadvantages.

To attain this, the present invention provides an opening in the end opposite the cutting tip to allow insertion of wire or cable and a set screw perpendicular to the drill bit to secure the wire or cable.

My invention resides not in any one of these features per se, but rather in the particular combination of all of them herein disclosed and claimed and it is distinguished from the prior an in this particular combination of all its features for the functions specified.

There has thus been outlined, rather broadly, the more important features of the invention in order that the detailed description thereof that follows may be better understood, and in order that the present contribution to the an may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and scientist, engineers and practitioners in the art who are not familiar with patent or legal terms or phraseology, to determine quickly from cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wire and cable feeding apparatus which has all the advantages of the prior an wire and cable feeding apparatus and none of the disadvantages.

It is another object of the present invention to provide a new and improved wire and cable feeding apparatus which may be easily and efficiently manufactured and marketed.

It is further object of the present invention to provide a new and improved wire and cable feeding apparatus which is durable and reliable in construction.

An even further object of the present invention is to provide a new and improved wire and cable feeding apparatus which is susceptible of low cost of manufacture with regard to both materials and labor, and which accordingly is then susceptible of low prices of sale to the consuming public, thereby making such wire and cable feeding apparatus economically available to the buying public.

Still yet another object of the present invention is to provide a new and improved wire and cable feeding apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a pan of this disclosure. For a better understanding of the invention, its advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
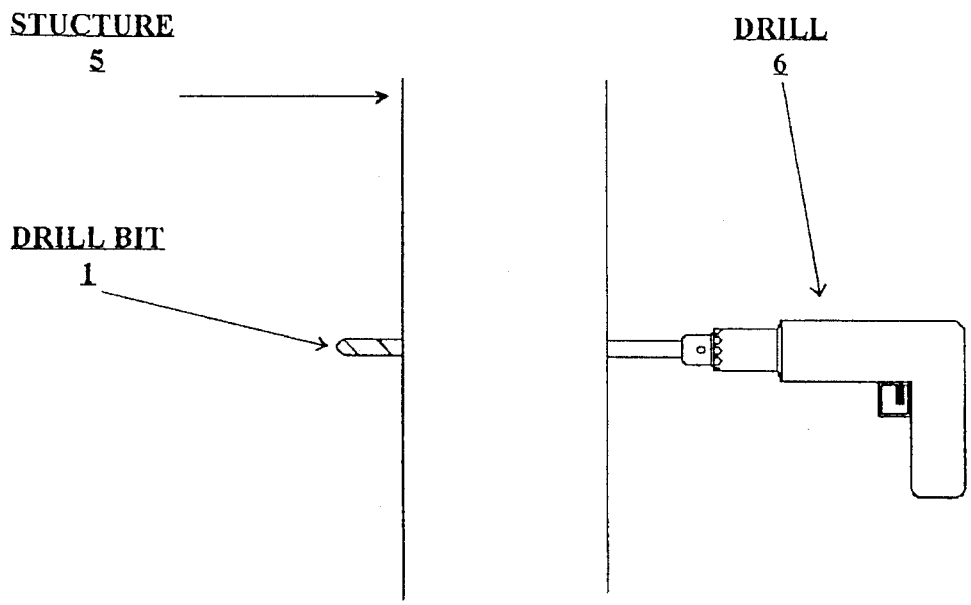
FIG. 1 is an orthographic cross-sectional illustration of the invention with a drill and a structure present.
Figure 2:
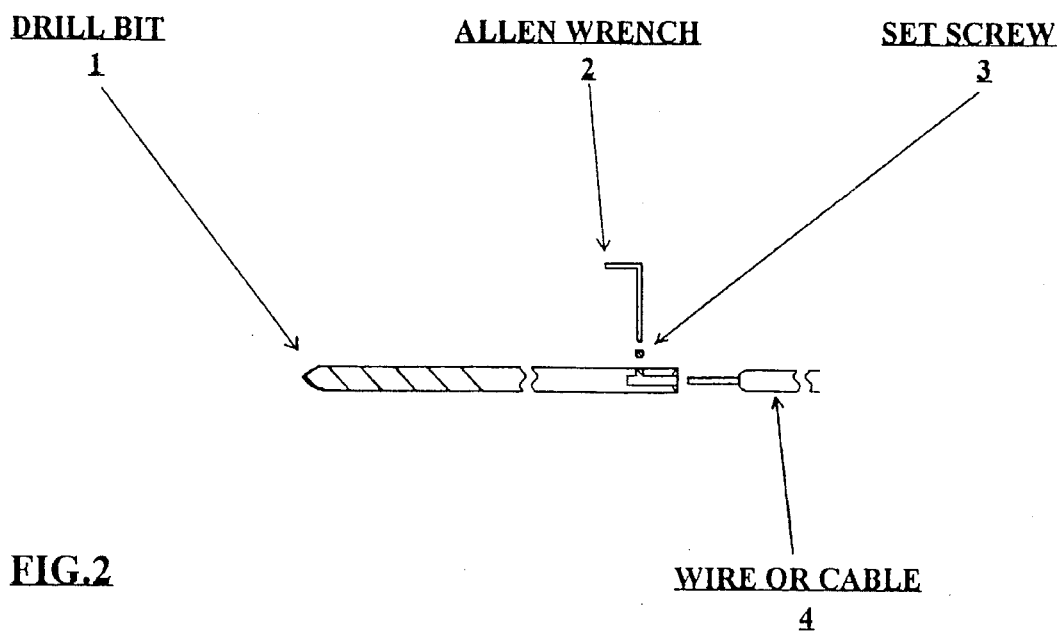
FIG. 2 is an orthographic cross-sectional illustration of the invention with an allen wrench, a set screw, and a wire or cable ready to insert.
Figure 3:
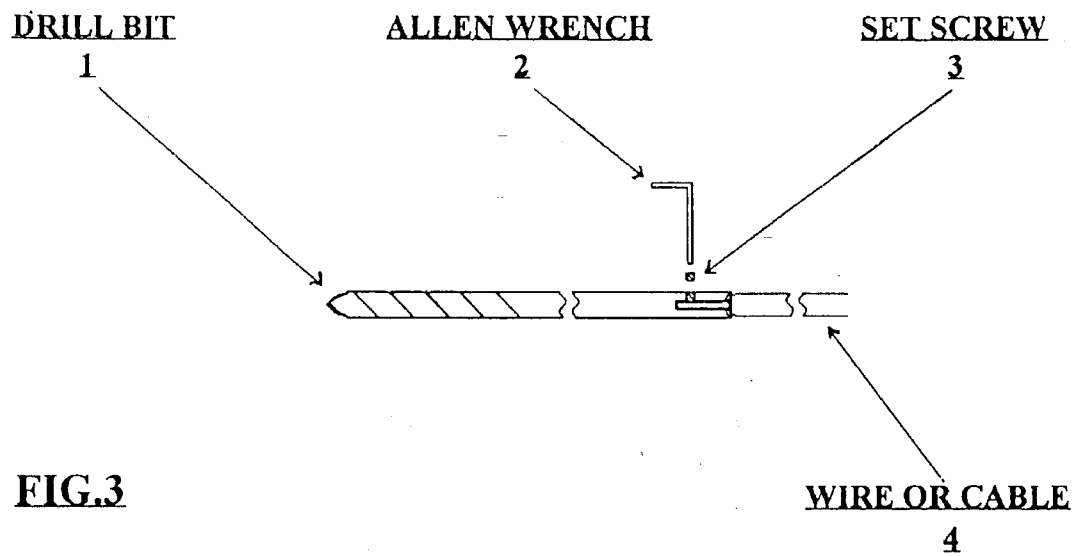
FIG. 3 is an orthographic cross-sectional illustration of the invention with an allen wrench, a set screw, and the wire or cable inserted into the invention.
Figure 4:
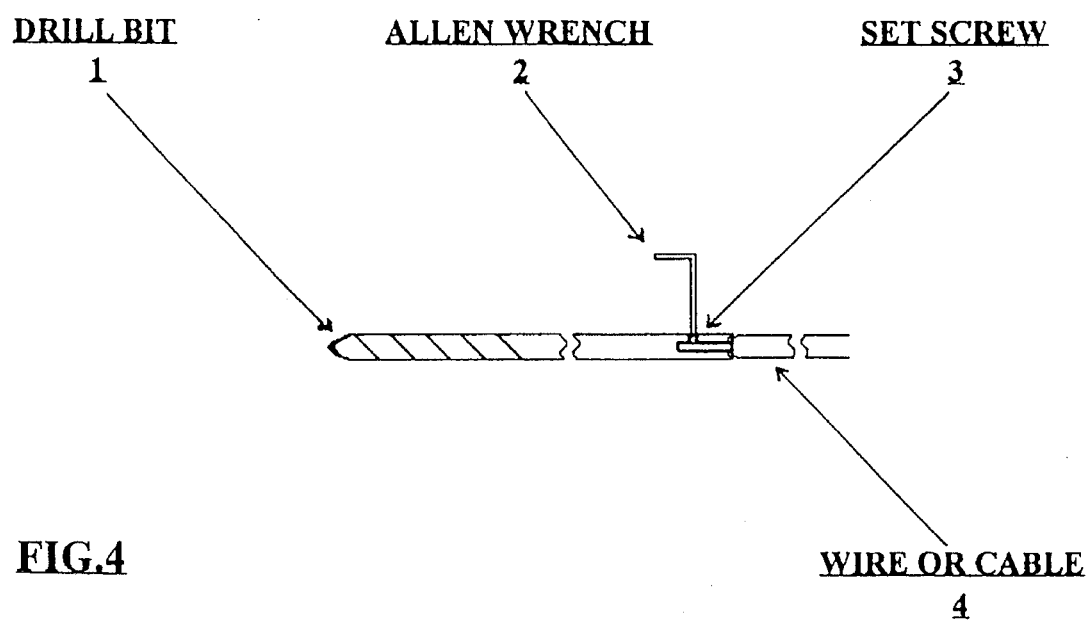
FIG. 4 is an orthographic cross-sectional illustration of the invention with an allen wrench, a set screw, and a wire or cable inserted into the invention, and showing the set screw tighten into the wire or cable.
Figure 5:
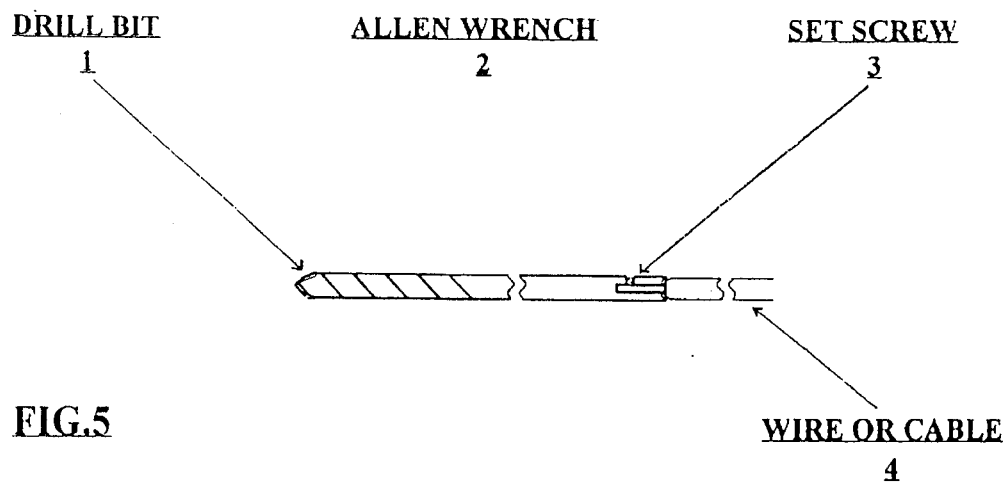
FIG. 5 is an orthographic cross-sectional illustration of the invention assembled to the wire or cable.
Figure 6:
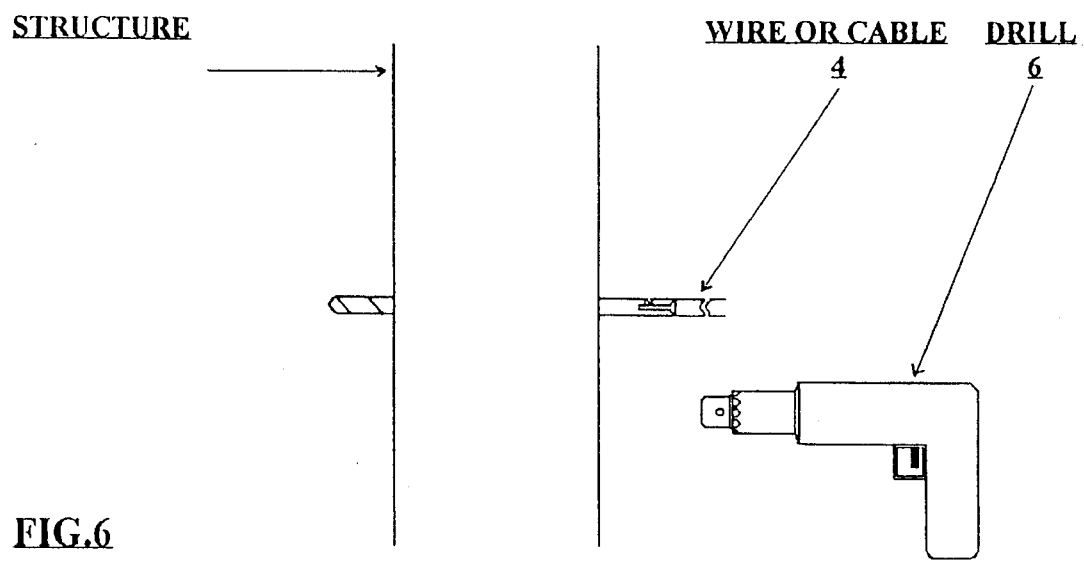
FIG. 6 is an orthographic cross-sectional illustration of the invention assembled to a wire or cable and feed through a structure.

With reference now to the drawings, and in particular to FIGS. 2 to 5 thereof, a new and improved wire and cable feeding apparatus embodying the principles and concepts of the present invention and generally designated by the reference number 1 will be described.

More specifically, the wire and cable feeding apparatus 1 of the instant invention essentially comprises a drill bit with an opening on the end opposite the cutting tip that includes an opening on the same end and perpendicular to the length of the drill bit and at a distance relevant to the wire or cable to accept a set screw 3 to secure the wire or cable. The diameter of the openings is directly relevant to the wire or cable size. The drill bit length is directly relevant to the thickness of the structure. A hole is drilled into and through a structure with invention 1 by a drill 6. Drill 6 is then removed leaving invention 1 remaining in the structure 5. A wire or cable 4 is then inserted into the invention 1. A set screw 3 is then tighten into the wire or cable 4 by the use of an allen wrench 2, thus securing it. The invention 1 assembled to the wire or cable 4 is then feed through the structure 5. Once the invention 1 is through, the set screw 3 is loosened and the wire or cable 4 is removed.

What is claimed as being new and desired to be protected by LETTERS PATENT of the United States is as follows:

1. A wire and cable feeding apparatus, comprising, a drill bit, the bit containing an opening opposite the cutting end with a length and diameter relevant to the wire or cable size, and a opening perpendicular to the length of the drill bit at a distance from the end opposite the cutting end relevant to the wire or cable size that receives a set screw to secure the wire or cable.

\* \* \* \* \*